United States Patent Office 3,732,118
Patented May 8, 1973

3,732,118
CHEMICAL PROCESS
Robert Langley, Newton Mearns, and Robert Bruce McKay, Kilmarnock, Scotland, assignors to Ciba-Geigy AG, Basel, Switzerland
No Drawing. Filed Dec. 24, 1970, Ser. No. 101,435
Int. Cl. C08h 17/14
U.S. Cl. 106—309                                    14 Claims

ABSTRACT OF THE DISCLOSURE

Flocculation resistant pigments are prepared by milling together a phthalocyanine pigment and a minor portion of a chloromethylated phthalocyanine pigment and a reactive polyamide.

DETAILED DESCRIPTION

The present invention relates to the novel products of the reaction of chloromethylated phthalocyanines with reactive polymeric polyamides and to phthalocyanine pigments modified by the presence therein of those condensation products. The thus modified pigments have improved flocculation resistance.

Phthalocyanine pigments, especially copper phthalocyanine, by virtue of their low cost, high strength, brilliant shades and outstanding general fastness properties are of great commercial importance.

In paint and lacquer systems, however, these pigments in all their various forms suffer from a particular defect which is not shared by most other organic pigments. The defect in question manifests itself particularly in paints based on titanium dioxide or other white inorganic pigment and the phthalocyanine pigment, especially in non-aqueous systems. If such paints are applied under different conditions of shear, widely different strengths of shade are obtained. Similarly, when paints or printing inks containing phthalocyanine pigments are stored, the pigment particles tend to aggregate with resulting loss of tinctorial strength and homogeneity of the paint or ink.

Many attempts have been made to try and overcome this flocculation problem with varying degrees of success. Thus, for example, British patent specification No. 949,-739 states that phthalocyanine pigment mixtures may be rendered resistant to flocculation by incorporating therein from 0.5 to 10 mole percent of a phthalocyanine methylene amine having the general formula:

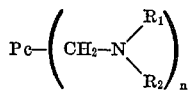

wherein Pc represents a phthalocyanine radical, $R_1$ is hydrogen or an unsubstituted or substituted aliphatic hydrocarbon radical, $R_2$ is an unsubstituted or substituted aliphatic hydrocarbon radical, or, when taken together with $R_1$ a heterocyclic ring, and $n$ is a number from 1 to 4, preferably 3 or 4.

We have now found that by incorporating novel synthetic resin condensation products of chloromethylated phthalocyanine with reactive polyamides into the phthalocyanine pigment tending to flocculate, pigment compositions are produced having surprisingly excellent flocculation-resistance combined with other desirable pigmentary properties such as high tinctorial power.

In our British patent application No. 40,455/69, there is described a process for the production of a flocculation-resistant phthalocyanine pigment comprising contacting together and milling, a phthalocyanine pigment having the tendency to flocculate, a minor amount of a chloromethylated copper phthalocyanine and a polymeric polyamide having at least one reactive amino group.

Each of the specific milling procedures described in our above identified copending application relates to grinding an essentially liquid mixture. However, these specific liquid-phase milling procedures, lack versatility somewhat, in that, in order to produce chlorinated phthalocyanines which are completely in the α-crystal form, it is necessary to use monochlorinated phthalocyanines as starting-material.

We have found, however, that by conducting the single-stage milling of the flocculating phthalocyanine, the chloromethylated phthalocyanine and the polymeric polyamide in the presence of sufficient solid particulate grinding to give a substantially dry grind, a versatile process results whereby crude β-phthalocyanines can be converted into α-form pigmentary material. Consequently, by means of this dry grind process, α-phthalocyanines with less than one atom of chlorine per mole of phthalocyanine can be produced.

Accordingly, the present invention provides a single-stage process for the production of a flocculation-resistant pigment composition, which process comprises contacting and milling a phthalocyanine pigment having the tendency to flocculate with a minor proportion of a chloromethylated phthalocyanine pigment and with a minor proportion of a reactive polyamide, the milling being carried out in the presence of a solid particulate grinding aid which is capable of being removed from the grind after milling, the grinding aid being present in sufficient amount to ensure a substantially dry grind.

Any phthalocyanine pigment having a tendency to flocculate may be employed as a starting-material in the process of the present invention. Thus the flocculating phthalocyanine may be unchlorinated or chlorinated, metal-free or metalliferous, the latter type containing such metals as nickel, cobalt or preferably copper. Of particular interest, however, is copper phthalocyanine or its chlorinated derivatives, containing from 0 to 10% chlorine, for instance the mono-chloro copper phthalocyanine and metal-free phthalocyanine.

The chloromethylated phthalocyanine compounds used according to the invention may be obtained for example according to the procedure described in British patent specification No. 586,340. Advantageously, they contain a minimum of 5% by weight, based on the weight of the phthalocyanine, of chlorine atoms linked to the phthalocyanine nucleus through —CH$_2$— groups. More preferably, the proportion of such chlorine atoms is within the range of from 10% to 30% by weight based on the weight of the phthalocyanine residue.

The reactive polyamides used according to the invention are those having at least one reactive amino group, i.e. an amino group in the polymeric polyamide molecule which will react with the chloromethylated phthalocyanine compound. They may be condensation products of polymeric fatty acids with polyamines, preferably in such ratio that the resulting polyamide resins possess an amine value in the range of from about 250 to 650 milligrams potassium hydroxide per gram of resin. Polymeric fatty acids advantageously represent the reaction products obtained by polymerization of one or more unsaturated long chain aliphatic or aromatic-aliphatic acids or their esters or other derivatives easily converted into the acid. Suitable examples of such polymeric fatty acids are described in British Pats. Nos. 878,985 and 841,554. Polymeric fatty acids or esters used for the production of reactive polyamides may also be epoxidised, for example by reaction with peracetic acid, performic acid or with hydrogen peroxide and formic acid or acetic acid. Suitable epoxidised fatty acids and esters are described in British Pats. 810,348 and 811,797.

As polyamines, which are employed for the preparation of the reactive polyamides, may be used aromatic polyamines or especially aliphatic polyamines which can also contain heterocyclic structures such as imidazolines.

Reactive polyamides may also be condensation products of polymeric fatty acids with polyamines described in British Pats. Nos. 726,570 and 847,028 which products may be reacted with epoxide resins derived by reaction from polyhydric phenols with polyfunctional halohydrins and/or glycerol dichlorohydrin and described in U.S. Pats. 2,585,115 and 2,589,245.

Also reactive polyamides formed by condensation polymerisation at high temperatures between a reaction mixture containing polymeric fatty acids (made in accordance with British Pats. Nos. 878,985 and 841,554) monomeric fatty acids and lower polyalkylene polyamines may be used according to the present invention.

Suitable reactive polyamide resins which may be used for the preparation of the polymeric phthalocyanine pigment derivatives according to the invention are described, for instance, in British Pats. Nos. 726,570, 810,348, 811,797, 847,028, 865,656 and 1,108,558, e.g. the compounds sold commercially as "Versamid 140," "Versamid 125," "Ancamide 400," "Backalide K 189," "Casamid 167," "Casamid 185M," "Genamid 2000," "Genamid 250," "Synolide 960," "Merginamide L 410" and "Wolfamid No. 4." ("Ancamide," "Backalide," "Casamid," "Genamid," "Synolide," "Merginamide," "Versamid" and "Wolfamid" are trade marks.)

The proportion of the chloromethylated phthalocyanine to that of the flocculating phthalocyanine employed in the single-stage process for the production of the pigment composition of the invention may be within the range of from 0.5% to 25% by weight, more preferably from 1% to 15% by weight.

Using a dry grind, a phthalocyanine pigment having the tendency to flocculate is contacted and milled with a minor proportion of a chloromethylated phthalocyanine pigment and with a minor proportion of a reactive polyamide, the milling being carried out in the presence of a solid particulate grinding aid which is capable of being removed from the grind after milling, the grinding aid being present in sufficient amount to ensure a substantially dry grind.

Especially on a large scale, the temperature of the charge tends to rise considerably on milling. In principle, there is no limit to this rise (such as boiling point of solvent) as would be the case in the wet milling process. Too large an increase in temperature may damage the performance of the pigment and some form of cooling system, for instance external water circulation, is preferably applied.

In the dry grind process of the invention, the flocculating phthalocyanine may be employed in any dry form as produced during its various stages of manufacture for instance in the dry crude form or as a dry powder of an acid pasted or salt ground pigmentary material. However, for reasons of economy, it is preferred to use the flocculating phthalocyanine compound in its crude form as a dry powder.

Advantageously, the reactive polyamide used in the dry grind is employed in substantially the stoichiometric proportion calculated from its amine value required for reaction with all the chloromethylated phthalocyanine. Based on the weight of the flocculating phthalocyanine pigment the proportion of the reactive polyamide is preferably within the range of from 0.5% to 25% more preferably within the range of from 2% to 15% by weight.

The reactive polyamide may be diluted with an organic liquid. Excessive dilution, however, is undesirable as it may lead to loss of flocculation resistance of the product or to caking of the mill charge. In general, the weight of diluent is preferably not greater than the weight of polyamide itself.

In the dry milling process of the invention it is preferred to have present in addition to the solid particulate grinding aid, a proportion within the range of from 5% to 30% by weight based on the weight of the grinding aid of a solid alkaline material, especially a basic salt, for example an alkali metal salt of a carboxylic acid or an alkali metal or alkaline earth metal oxide or carbonate. Specific alkaline materials which may be used with advantage in the milling process include, for example, sodium acetate, sodium carbonate and calcium oxide.

The solid particulate grinding aid used is preferably a water-soluble metal salt more preferably an alkali metal or alkaline earth metal salt of a mineral acid, for instance potassium, calcium or magnesium salt of hydrochloric or sulphuric acid, but especially sodium chloride, sodium sulphate or calcium chloride, or mixtures of sodium chloride with sodium sulphate, or of sodium chloride with calcium chloride.

When an alkali metal or alkaline earth metal salt is employed, the proportion used is advantageously within the range of from 50% to 1000% by weight, more preferably within the range of from 200% to 500% by weight, based on the weight of the flocculating phthalocyanine pigment.

Any milling apparatus capable of handling a substantially dry grind, especially a ball mill or vibratory mill containing grinding elements such as steel balls, rods or discs, may be employed in order to carry out the process of the present invention.

Thus the dry milling process of the invention may be conveniently effected by charging the flocculating phthalocyanine compound, the chloromethylated phthalocyanine compound, especially both in the crude form, the reactive polyamide and the salt grinding aid, into a suitable mill and milling the mixture for an extended period, preferably for a period within the range of from 1 to 100 hours depending on the type of mill employed. If an organic solvent is used in conjunction with the polyamide in this dry process, then it should be present in a quantity preferably not greater in weight than that of the polyamide.

During the single-stage milling process of the invention, the reactive polyamide and the chloromethylated phthalocyanine are caused to react together and the reaction product formed in situ is incorporated into the flocculating phthalocyanine all in the same operation. As a consequence, the milling process of the invention enjoys considerable economic advantages over known processes in which pre-formed non-flocculating phthalocyanines are separately incorporated into the flocculating phthalocyanine.

The pigment compositions produced according to the process of the present invention have high tinctorial power and exhibit excellent resistance to flocculation, for instance when incorporated into surface-coating compositions such as medium or long oil alkyd paints, melamine formaldehyde modified alkyd paints or acrylic paints.

The following examples further illustrate the present invention. Parts by weight bear the same relation to parts by volume as do kilograms to litres.

EXAMPLE 1

18 parts of crude monochloro copper phthalocyanine powder, 2 parts of chloromethylated copper phthalocyanine (having a chlorine content within the range of from 13% to 18% by weight) 100 parts of anhydrous sodium sulphate, 50 parts of anhydrous sodium acetate and 2 parts of Versamid 140 (a reactive polyamide of amine value within the range of from 350 to 400 milligrams of potassium hydroxide per gram) were mixed to give an even powder and milled for 8 hours.

The salt/pigment mixture was then recovered by sieving, slurried with water and stirred for 30 minutes and filtered. The filter cake was washed with water until free from salt and dried.

The pigment so produced exhibited excellent tinctorial power and flocculation-resistance in surface-coating compositions.

EXAMPLES 2 TO 6

9 parts of crude monochloro copper phthalocyanine powder, 13.5 parts of copper phthalocyanine powder, 2.5 parts of chloromethylated copper phthalocyanine (having a chlorine content of 14% by weight), 70 parts of anhydrous sodium sulphate, 5 parts of anhydrous sodium acetate and 2 parts of Synolide 960 (having an amine value within the range of from 360 to 380 milligrams of potassium hydroxide per gram) were mixed to give an even powder and milled for 8 hours. The salt/pigment was then recovered by sieving, slurried with water, stirred for 30 minutes and filtered. The filter cake was washed with water until free from salt and dried.

The pigment so produced exhibited excellent tinctorial power and flocculation resistance in surface coating compositions. Pigment compositions having similar excellent tinctorial and flocculation-resistance properties were produced when the procedure described in the preceding paragraph was repeated but replacing the Synolide 960 used therein by one of the following polyamide resins:

Genamid 2000 (amine value 575–626 milligrams of potassium hydroxide per gram), Versamid 140 or Casamid 185 M (amine value 350 to 400 milligrams of potassium hydroxide per gram) or Versamid 125 (amine value 290–320 milligrams of potassium hydroxide per gram).

EXAMPLE 7

22.5 parts of crude copper phthalocyanine powder, 2.5 parts of chloromethylated copper phthalocyanine (having a chlorine content of 13% by weight), 70 parts of anhydrous sodium sulphate, 5 parts of anhydrous sodium acetate and 2 parts of Versamid 140, were mixed to form an even powder and milled for 8 hours. The pigment was then recovered and worked up as described in Example 1.

The pigment so obtained showed a high tinctorial power and good flocculation-resistance in surface coating compositions.

EXAMPLE 8

A pigment was produced according to the procedure described in Example 7 but using instead of 22.5 parts of crude copper phthalocyanine powder, the same amount of crude chlorinated copper phthalocyanine (containing 2% by weight of chlorine) and using 1 instead of 2 parts by weight of Versamid 140.

The pigment obtained in this manner, has a high tinctorial power and good flocculation-resistance in surface coating compositions.

EXAMPLE 9

22.5 parts crude metal-free phthalocyanine
2.5 parts chloromethylated copper phthalocyanine (20% chlorine by weight)
65 parts sodium sulphate (anhydrous)
10 parts sodium acetate (anhydrous)
2 parts polymeric polyamide sold under the trade mark "Casamid 185M"

were mixed to give an even powder and milled for 7½ hours. After milling, the mix was discharged, stirred in 600 parts of water for 1 hour at 50° C., and filtered, the filter cake was washed acid-and-salt-free and dried at 50–60° C.

The pigment produced had better flocculation resistance in coating compositions than pigments produced in a similar manner, but in the absence of either "Casamid 185M" or of chloromethylated copper phthalocyanine or of both. It had a slightly bluer shade than the metal free phthalocyanine itself.

EXAMPLES 10 AND 11

The procedure described in Example 9 was repeated, except that the polymeric polyamides sold under the trade marks "Ancamide 400" and "Merginamide L410" were substituted for the "Casamid 185M." The pigments obtained had similar properties to that obtained in Example 9.

EXAMPLE 12

The procedure described in Example 9 was repeated except that dry sodium chloride was substituted for the anhydrous sodium sulphate. The pigment obtained had similar properties to that obtained in Example 9.

What we claim is:

1. A process of producing a flocculation-resistant pigment composition comprising contacting and milling in a single stage a pththalocyanine pigment having the tendency to flocculate with a minor proportion of a chloromethylated phthalocyanine pigment and with a minor proportion of a reactive polyamide, the milling being carried out in the presence of a solid particulate grinding aid which is capable of being removed from the grind after milling, the grinding aid being present in sufficient amount to ensure a substantially dry grind.

2. A process as claimed in claim 1 wherein the flocculating phthalocyanine pigment is mono-chloro copper phthalocyanine.

3. A process as claimed in claim 1 wherein the proportion of chloromethylated phthalocyanine to that of flocculating phthalocyanine is within the range of from 1% to 15% by weight.

4. A process as claimed in claim 1 wherein the flocculating phthalocyanine is used in its crude form as dry powder.

5. A process as claimed in claim 1 wherein the proportion of the reactive polyamide in the grind is from 2% to 15% by weight based on the weight of the flocculating phthalocyanine.

6. A process as claimed in claim 1 wherein a proportion of solid alkaline material within the range of from 5% to 30% by weight based on the weight of the grinding aid, is present in the grind.

7. A process as claimed in claim 6 wherein the solid alkaline material is an alkali metal salt of a carboxylic acid or an alkali metal or alkaline earth metal oxide or carbonate.

8. A process as claimed in claim 7 wherein the solid alkaline material is sodium acetate.

9. A process as claimed in claim 6 wherein the solid particulate grinding aid is an alkali metal or alkaline earth metal salt of a mineral acid.

10. A process as claimed in claim 8 wherein the proportion of the alkali metal or alkaline earth metal salt is from 200% to 500% by weight based on the weight of the flocculating phthalocyanine pigment.

11. A process as claimed in claim 7 wherein the salt is sodium sulphate, sodium chloride or calcium chloride.

12. A process as claimed in claim 1 wherein the reactive polyamide is diluted with acetic anhydride.

13. A process as claimed in claim 1 wherein the flocculating phthalocyanine contains from 0 to 10% chlorine.

14. A process as claimed in claim 1 wherein the flocculating phthalocyanine is a metal-free phthalocyanine.

References Cited

UNITED STATES PATENTS 3,288,621  11/1966  Barron et al. _____ 106—288 Q
3,075,849  1/1963  Dreher et al. _____ 106—177

DELBERT E. GANTZ, Primary Examiner

J. V. HOWARD, Assistant Examiner

U.S. Cl. X.R.

106—288 Q, 308 N

UNITED STATES PATENT OFFICE
CERTIFICATE OF CORRECTION

Patent No. 3,732,118     Dated May 8, 1973

Inventor(s) Robert LANGLEY and Robert Bruce MCKAY

It is certified that error appears in the above-identified patent and that said Letters Patent are hereby corrected as shown below:

Insert in the Heading of the Patent, after the Serial No.,

--Claims priority, Great Britain    February 14, 1970, 7217/70--.

Signed and sealed this 9th day of April 1974.

(SEAL)
Attest:

EDWARD M.FLETCHER,JR.                C. MARSHALL DANN
Attesting Officer                    Commissioner of Patents